United States Patent
Kruglick

(10) Patent No.: US 9,419,993 B2
(45) Date of Patent: Aug. 16, 2016

(54) RANDOMIZATION OF PROCESSOR SUBUNIT TIMING TO ENHANCE SECURITY

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days.

(21) Appl. No.: 14/380,371

(22) PCT Filed: Dec. 12, 2013

(86) PCT No.: PCT/US2013/074510
§ 371 (c)(1),
(2) Date: Aug. 21, 2014

(87) PCT Pub. No.: WO2015/088525
PCT Pub. Date: Jun. 18, 2015

(65) Prior Publication Data
US 2015/0350239 A1    Dec. 3, 2015

(51) Int. Cl.
*H04L 29/06*    (2006.01)
*G06F 9/455*    (2006.01)
*G06F 21/55*    (2013.01)

(52) U.S. Cl.
CPC ........ *H04L 63/1441* (2013.01); *G06F 9/45558* (2013.01); *G06F 21/556* (2013.01); *G06F 2009/45587* (2013.01)

(58) Field of Classification Search
CPC .............................. G06F 21/577; G06F 9/3877
USPC .................... 726/25; 713/340; 718/1; 380/28
See application file for complete search history.

(56) References Cited

U.S. PATENT DOCUMENTS

| | | | | | |
|---|---|---|---|---|---|
| 5,623,647 | A | * | 4/1997 | Maitra | G06F 1/206 713/501 |
| 6,668,325 | B1 | * | 12/2003 | Collberg | G06F 21/14 713/194 |

(Continued)

FOREIGN PATENT DOCUMENTS

| EP | 2230794 A2 | 9/2010 |
|---|---|---|
| WO | 0237219 A2 | 5/2002 |

OTHER PUBLICATIONS

Lewis et al. WO 2002/037219 A2.*

(Continued)

*Primary Examiner* — Izunna Okeke
*Assistant Examiner* — Hee Song
(74) *Attorney, Agent, or Firm* — Turk IP Law, LLC

(57) ABSTRACT

Technologies are generally provided for a system to enhance security and prevent side channel attacks of targeted functions. Side channel attacks assume that the targeted functions operate at same speed each time, and observe timing data of the targeted functions to glean secure information. According to some examples, an enhanced security system may alter a processing speed of one or more subunits of a processor executing the targeted function(s) to transparently change an instantaneous performance of the processor in an unpredictable manner. The performance time of the targeted function(s) may thereby be randomized. A virtual machine manager (VMM) may identify a security risk for a targeted function, and trigger one or more subunits of the processor to operate at a reduced frequency. After completion of the targeted function, the subunits may be returned to a default performance speed.

18 Claims, 7 Drawing Sheets

(56) References Cited

U.S. PATENT DOCUMENTS

| | | | | |
|---|---|---|---|---|
| 2004/0105541 | A1* | 6/2004 | Elbe | G06F 7/72 380/28 |
| 2007/0064930 | A1 | 3/2007 | Fischer | |
| 2009/0010424 | A1* | 1/2009 | Qi | G06F 7/723 380/28 |
| 2010/0095133 | A1 | 4/2010 | Peter et al. | |
| 2011/0228926 | A1* | 9/2011 | Shumow | G06F 21/556 380/1 |
| 2013/0007881 | A1 | 1/2013 | Liem et al. | |
| 2013/0055398 | A1* | 2/2013 | Li | G06F 21/577 726/25 |
| 2013/0074188 | A1* | 3/2013 | Giakouminakis | G06F 21/577 726/25 |
| 2015/0082434 | A1* | 3/2015 | Sethumadhavan | G06F 21/556 726/23 |

OTHER PUBLICATIONS

Costan et al., "Security Challenges and Opportunities in Adaptive and Reconfigurable Hardware," In IEEE International Symposium on Hardware-Oriented Security and Trust (Host), pp. 6 (2011).*

"Catalyst SSL Services Module Deployment in the Data Center with Back-End Encryption," Cisco Systems, chapter 6, San Jose, CA, US, pp. 1-72 (Nov. 2006).

"Decorators and Functional Python," posted on Jan. 2, 2013, accessed at http://web.archive.org/web/20130728103534/http://www.brianholdefehr.com/decorators-and-functional-python, accessed on Aug. 12, 2014, pp. 15.

"Jrfonseca," accessed at http://web.archive.org/web/20131211152348/http://code.google.com/p/jrfonseca/wiki/Gprof2Dot, accessed on Aug. 12, 2014, pp. 11.

Ahmed, S., et al., "ETS (Efficient, Transparent, and Secured) self-healing service for pervasive computing applications," International Journal of Network Security, vol. 4, No. 3, pp. 271-281 (2007).

Chakraborty, D., et al., "Efficient Hardware Implementations of BRW Polynomials and Tweakable Enciphering Schemes," IEEE Transactions on Computers, vol. 62, No. 2, pp. 279-294 (Feb. 2013).

Costan, V., et al. "Security Challenges and Opportunities in Adaptive and Reconfigurable Hardware," In IEEE International Symposium on Hardware-Oriented Security and Trust (HOST), pp. 6 (2011).

Eddy, N., "Cloud Computing Growth Hampered by Cost, Security Concerns: Survey," posted on Jul. 22, 2011, accessed at http://www.eweek.com/c/a/Midmarket/Cloud-Computing-Growth-Hampered-by-Cost-Security-Concerns-Survey-482398/, accessed on Aug. 13, 2014, pp. 5.

Hu, W.-M., "Reducing Timing Channels with Fuzzy Time," 1991 IEEE Computer Society Symposium on Research in Security and Privacy, p. 8-20, May 1991.

International search Report and written opinion for PCT application No. PCT/US2013/074510 mailed on May 14, 2014.

Iyer, A., and Marculescu, D., "Power efficiency of voltage scaling in multiple clock, multiple voltage cores," Proceeding ICCAD '02 Proceedings of the 2002 IEEE/ACM international conference on Computer-aided design, pp. 379-386 (2002).

Iyer, R., et al., "Virtual platform architectures for resource metering in datacenters," ACM SIGMETRICS Performance Evaluation Review, vol. 37, No. 2, pp. 89-90 (2009).

Kaiser, G., et al., "An Approach to Autonomizing Legacy Systems," in Workshop on Self-Healing, Adaptive and Self-MANaged Systems, pp. 6 (2002).

Marculescu, D., and Talpes, E., "Variability and Energy Awareness: a Microarchitecture-level Perspective," In Proceedings 42nd Design Automation Conference, pp. 11-16(2005).

McMillan, R., "Researchers find a new way to attack the cloud," posted on Sep. 3, 2009, accessed at http://www.computerworld.com/s/article/9137507/Researchers_find_a_new_way_to_attack_the_cloud?taxonomyId=172&pageNumber=2, accessed on Aug. 12, 2014, pp. 3.

Miller, T. N., et al., "Mitigating the Effects of Process Variation in Ultra-low Voltage Chip Multiprocessors Using Dual Supply Voltages and Half-Speed Units" Computer Architecture Letters, vol. 11, No. 2, pp. 45-48 (2011).

Mishra, A. K., et al., "Towards characterizing cloud backend workloads: insights from Google compute clusters," ACM SIGMETRICS Performance Evaluation Review, vol. 37, No. 4, pp. 34-41 (2010).

Percival, C., "Cache missing for fun and profit," Presented at BSDCan 2005, pp. 1-13 (2005).

Reves, J., and Panchen, S., "Traffic monitoring with packet-based sampling for defense against security threats," InMon Corporation and Hewlett-Packard Company, pp. 9 (2002).

Ristenpart, T., et al., "Hey, you, get off of my cloud: exploring information leakage in third-party compute clouds," in Proceedings of the 16th ACM conference on Computer and communications security, pp. 199-212 (2009).

Semeraro, G., et al., "Dynamic Frequency and Voltage Control for a Multiple Clock Domain Microarchitecture," Proceedings. 35th Annual IEEE/ACM International Symposium on Microarchitecture, pp. 356-367 (2002).

Seok, M., et al., "CAS-FEST 2010: Mitigating Variability in Near-Threshold Computing," IEEE Journal on Emerging and Selected Topics in Circuits and Systems, vol. 1, No. 1, pp. 42-49 (Mar. 2011).

Talpes, E., and Marculescu, D., "A Critical Analysis of Application-Adaptive Multiple Clock Processors," Proceedings of the 2003 International Symposium on Low Power Electronics and Design, 2003. ISLPED '03., pp. 278-281 (2003).

Teodorescu, R., et al., "Mitigating parameter variation with dynamic fine-grain body biasing," in International Symposium on Microarchitecture, pp. 27-39 (2007).

Li, T. et al., "Operating System Support for overlapping-ISA Heterogeneous Multi-core Architectures," 2010 IEEE 16th International Symposium on High Performance Computer Architecture (HPCA), pp. 1-12 (2010).

Tromer, E., et al., "Efficient cache attacks on AES, and countermeasures," International Association for Cryptologic Research 2009, vol. 23, No. 1, pp. 37-71 (2009).

Xiaoyao, L., et al., "ReVIVaL: A Variation-Tolerant Architecture Using Voltage Interpolation and Variable Latency," In 35th International Symposium on Computer Architecture, 2008. ISCA '08, pp. 191-202 (2008).

Zhou, M., et al., "Security and Privacy in Cloud Computing: A Survey," In 2010 Sixth International Conference on Semantics Knowledge and Grid (SKG), IEEE, pp. 105-112 (2010).

* cited by examiner

US 9,419,993 B2

RANDOMIZATION OF PROCESSOR SUBUNIT TIMING TO ENHANCE SECURITY

CROSS-REFERENCE TO RELATED APPLICATION

This Application is the National Stage filing under 35 U.S.C §371 of PCT Application Ser. No. PCT/US13/74510 filed on Dec. 12, 2013. The PCT Application is herein incorporated by reference in their entirety.

Unless otherwise indicated herein, the materials described in this section are not prior art to the claims in this application and are not admitted to be prior art by inclusion in this section.

The move to cloud computing platforms brings flexible computing that reaps economies of scale, enabling service providers to make better use of resources. Cloud computing providers may enable several virtual machines from different clients and service providers to be multiplexed on a single physical machine, or datacenter. Hosting multiple virtual machines from multiple different clients at a single datacenter may bring security challenges, such as a risk of side channel attacks from malicious clients. Side channel attacks use timers or other means to glean secure information from the processing times of co-resident processes. For example, the side channel attacker may use an elapsed time for key hashing to determine properties of the key. Timing can also be used to detect colocation with a target, a necessary step to execute a datacenter attack, which may be done by observing timing associated with various cache or branch hardware to detect signature computing patterns and timing. Side channel attack elements may be based on mutual hardware and rely on thoroughly characterized timing of target functions. The timing data may need to be precise and repeatable, and the attack may depend on the presumption that the target functions operate at a same speed each time. Any deviations from the expected time may be used to infer values being computed. Any variation that can make a return time of a target function less predictable may strengthen an application against side channel detection and attack.

SUMMARY

The present disclosure generally describes techniques to enhance security of targeted functions.

According to some examples, the present disclosure describes methods to enhance security of targeted functions. An example method may include determining a preferred security timing obscuration, detecting initiation of execution of a targeted function at a processor, detuning a performance of one or more subunits of the processor associated with the targeted function based on the security timing obscuration, determining whether the targeted function is still in operation, and in response to a determination that the targeted function has completed operation, returning the performance of the one or more subunits to a previous state before the detuning.

The present disclosure also describes servers hosted at a datacenter configured to enhance security of targeted functions. An example server may include one or more virtual machines configured to be executed on the server, each virtual machine configured to provide computing services including data storage and data processing, and a virtual machine manager configured to manage the one or more virtual machines. The virtual machine manager may be further configured to determine a preferred security timing obscuration, detect initiation of a targeted function at a processor of at least one virtual machine of the datacenter, reduce a performance speed of at least one subunit of the processor associated with the targeted function based on the security timing obscuration, determine whether the targeted function is still in operation, and in response to a determination that the targeted function has completed operation, return the performance of the at least one subunit to a previous state before the performance speed reduction.

The present disclosure also describes cloud-based datacenters configured to enhance security of targeted functions. An example datacenter may include one or more servers configured to execute one or more virtual machines, each virtual machine configured to provide computing services including data storage and data processing, and a virtual machine manager configured to manage the one or more virtual machines. The virtual machine manager is further configured to determine a preferred security timing obscuration, detect initiation of a targeted function at a processor of at least one virtual machine of the datacenter, detune a performance of at least one subunit of the processor associated with the targeted function based on the security timing obscuration, determine whether the targeted function is still in operation, and in response to a determination that the targeted function has completed operation, return the performance of the at least one subunit to a previous state before the performance speed reduction.

The present disclosure further describes a computer readable storage medium with instructions stored thereon, which when executed on one or more computing devices execute a method to enhance security of targeted functions performed, including determining a preferred security timing obscuration, detecting initiation of operation of a targeted function at a processor, detuning a performance of one or more subunits of the processor associated with the targeted function based on the security timing obscuration, determining whether the targeted function is still in operation, and in response to a determination that the targeted function has completed operation, returning the performance of the one or more subunits to a previous state before the detuning.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
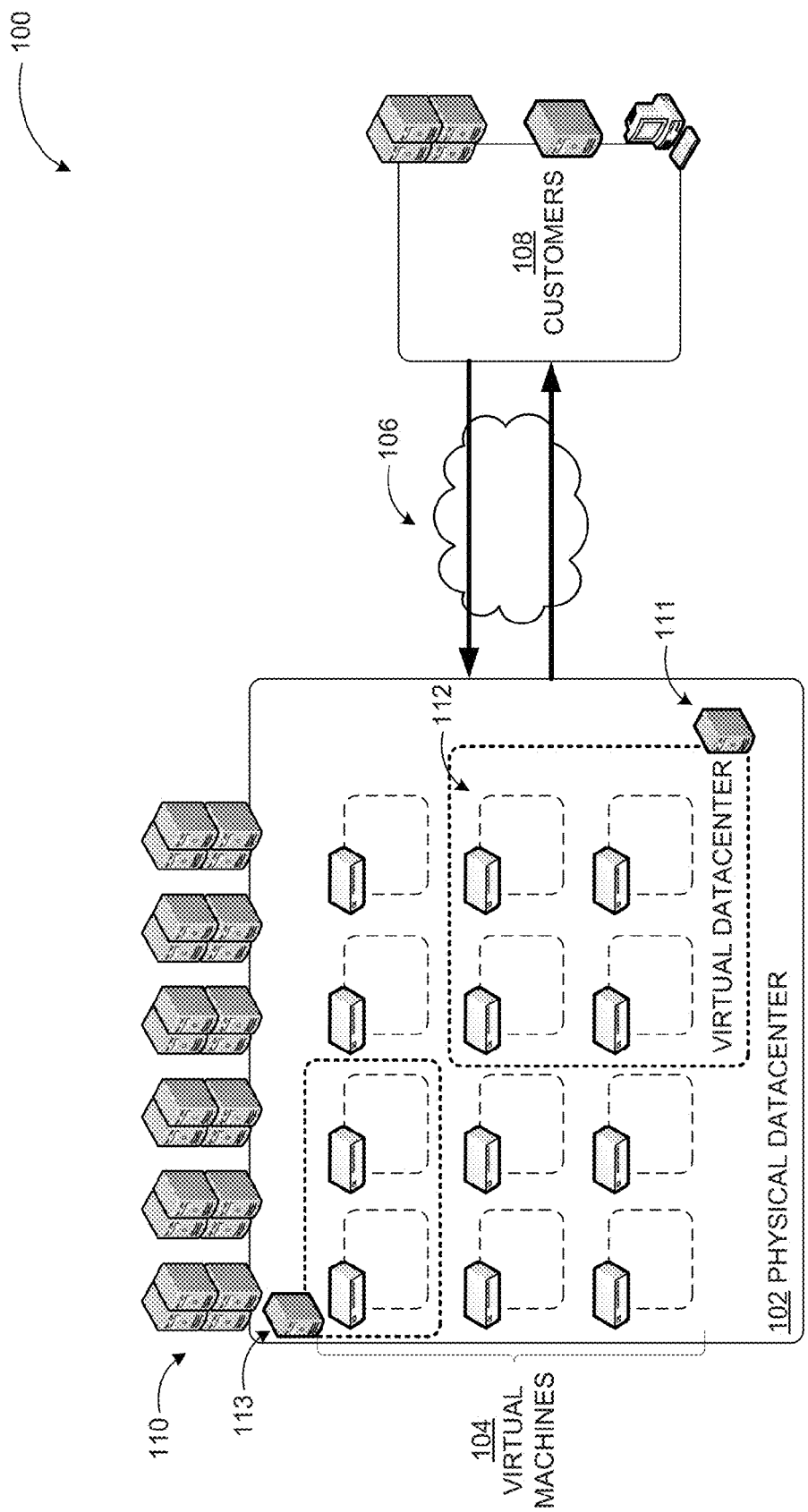
FIG. 1 illustrates an example datacenter-based system where security may be enhanced through prevention of side channel attacks of targeted functions.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to enhanced security of targeted functions.

Briefly stated, technologies are generally provided for a system to enhance security and prevent side channel attacks of targeted functions. Many side channel attacks assume that the targeted functions operate at same speed each time, and observe timing data of the targeted functions to glean secure information. An enhanced security system according to some examples may alter a processing speed of one or more subunits of a processor executing the targeted function(s) to transparently change an instantaneous performance of the processor in an unpredictable manner. The performance time of the targeted function(s) may thereby be randomized. A virtual machine manager (VMM) may identify a security risk for a targeted function, and trigger one or more subunits of the processor to operate at a reduced frequency. After completion of the targeted function, the subunits may be returned to a default performance speed.

A datacenter as used herein refers to an entity that hosts services and applications for customers through one or more physical server installations and one or more virtual machines executed in those server installations. Customers of the datacenter, also referred to as tenants, may be organizations that provide access to their services for multiple users. One example configuration may include an online retail service that provides retail sale services to consumers (users). The retail service may employ multiple applications (e.g., presentation of retail goods, purchase management, shipping management, inventory management, etc.), which may be hosted by one or more datacenters. Thus, a consumer may communicate with those applications of the retail service through a client application such as a browser over one or more networks and receive the provided service without realizing where the individual applications are actually executed. This scenario contrasts with configurations where each service provider would execute their applications and have their users access those applications on the retail service's own servers physically located on retail service premises. One result of the networked approach described herein is that applications and virtual machines on a datacenter may be vulnerable to side channel attacks that take advantage of timing data of targeted functions to extract secure information.

While some example embodiments have been described using datacenter environments herein, embodiments are not limited to implementation at datacenters. Randomization of processor subunit timing to enhance security may also be implemented, for example, in various computing devices such as desktop computers or even mobile devices when virtualization is being used to compartmentalize applications for security.

FIG. 1 illustrates an example datacenter-based system where security may be enhanced through prevention of side channel attacks of targeted functions, arranged in accordance with at least some embodiments described herein.

As shown in a diagram 100, a physical datacenter 102 may include one or more physical servers 110, 111, and 113, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the physical servers 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual users or enterprise customers, via a cloud 106.

According to some embodiments, a customer with an application and/or virtual machines 104 being executed at the physical datacenter 102 may wish to implement a system to secure the application and/or the virtual machines 104 against side channel attacks from malicious clients. Side channel attackers may use timers to glean information from observed processing times of processes being executed on one or more virtual machines 104 at the physical datacenter. A malicious client may also have an application or virtual machine executed at the physical datacenter 102, and the malicious client may use his application to obtain secure information from a target virtual machine at the same datacenter. The malicious client may observe an elapsed time for a process associated with a victim executed at a target virtual machine. For example, the malicious client may observe the elapsed time for a key hashing process in order to determine properties of the key for key decryption and password extraction. In another example, a side channel attacker may use known timing of target processes associated with one or more victims executed at the physical datacenter 102 to determine a functional path profile for the target processes. The side channel attacker may then use timing of operations within a target function, for example an encryption, to extract the encryption key. The side channel attacker may observe timing of processes (e.g., reads, writes, etc.) associated with various cache and/or branch hardware at co-resident virtual machines in order to detect signature computing patterns and timing of processes associated with a particular virtual machine.

Side channel attacks may depend on repeated observations of the same target functions being executed at a target virtual machine for one or more customer or datacenter applications, and may assume that the target function operates at substantially the same speed each time. Since side channel attacks rely on characterized timing of target functions, the timing data may need to be precise and repeatable for the side channel attacker to determine secure information based on the timing. Any deviations from the timing may be used to infer a value being computed. In a system according to same embodiments, timing of targeted functions of an application may be altered to randomize an execution speed of a targeted function and to make the timing unpredictable, in order to secure against side channel attacks. The embodiments also modify power usage that may defend against power channel attacks.

Figure 2:
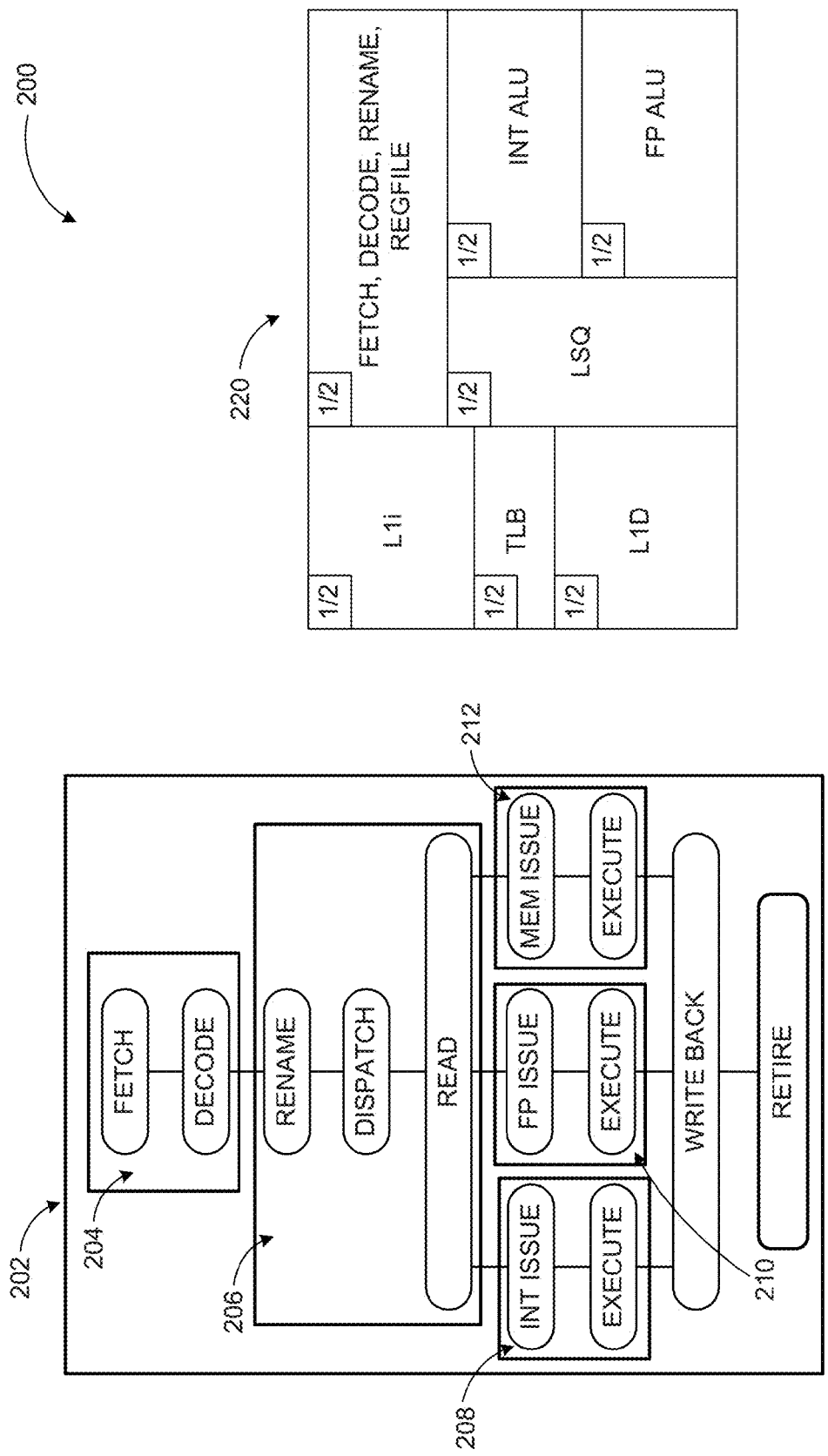
FIG. 2 illustrates example processor architectures and a subunit layout of the processor where subunit detuning may be implemented.

FIG. 2 illustrates example processor architectures and a subunit layout of the processor where subunit detuning may be implemented, arranged in accordance with at least some embodiments described herein.

A diagram 200 of FIG. 2 illustrates an example processor architecture 202 partitioned into groups of functional subunits of an example processor. Examples of groups of functional subunits include a clock domain 204, a clock domain 206, a clock domain 208, a clock domain 210, and a clock domain 212. The clock domain 204 may include a fetch subunit and a decode subunit. The fetch subunit may retrieve an example set of instructions from a cache or a memory associated with the processor. The decode subunit may decode the instructions to allow the instructions to be translated for further processing. In addition, the clock domain 206 of the processor may include a rename subunit, a dispatch subunit, and a read subunit. The rename subunit may manage operations associated with renaming the instructions to appropriate micro-operations after decoding of the instructions. The dispatch subunit may manage operations associated with dispatching the instructions to the read subunit for further processing. The read subunit may manage operations associated with reading the instructions and transmitting the instructions to processing subunits associated with the instruction type.

The read subunit may transmit instructions associated with integer operations to the clock domain 208 of the processor. The clock domain 208 may include an integer (INT) issue subunit and an execute subunit. The integer issue subunit may process integer based instructions. The execute subunit may execute the processed integer instruction. In addition, the clock domain 210 of the processor may receive floating point (FP) instructions from the read subunit and process the instructions in an FP issue subunit. The FP based instructions may be executed by an execute subunit of the clock domain 210. Furthermore, instructions related to memory storage may be processed by a memory (MEM) issue subunit of the clock domain 212 of the processor. An execute subunit of the clock domain 212 may execute the memory instructions. The clock domains 208, 210, and 212 may transmit executed instructions to a write back subunit, which may aggregate the instructions. The write back subunit may transmit the instructions to the memory or other peripherals associated with the processor. Moreover, a retire subunit may execute operations associated with cleaning remnants from processing the set of instructions. The operations executed by the retire subunit may include emptying of registers associated with the clock domains 204, 206, 208, 210, and 212.

The diagram 200 also illustrates a subunit block diagram 220 of an example processor. The processor may include a multitude of subunits, such as an integer arithmetic logic unit (INT ALU) subunit, a translation look ahead buffer (TLB) subunit, a unified reorder buffer (ROB) subunit, an L1 instruction (L1i) cache subunit, an L1 decode (L1D) cache subunit, a load/store queue (LSQ) subunit, an FP ALU subunit, a fetch, decode, rename, regular expression file (REGFILE) subunit, as some examples. Each subunit may be configured to perform a specific operation for an overall function performed by the processor.

In some systems, the datacenter may instruct the processor to increase performance and energy efficiency by varying voltage and frequency levels to near threshold levels of the processor. In an example scenario, a subset of the subunits of the processor may fail at the near threshold levels, as the subset may not be able to efficiently function at the near threshold levels. If the one or more of the subunits fail, then the performance of the processor may also diminish as a result. A subunit that fails at a near threshold level may be a limiting or weak subunit. In an example embodiment, it may be possible to allow a limiting or weak subunit to operate at a reduced performance level. An example of a reduced performance level may include a reduced frequency level. Allowing the limiting or weak subunit to operate at the reduced performance level may allow the processor to maintain a sufficient performance level. The processor may achieve operation of the limiting or weak subunit at the reduced performance level by slowing down, or detuning, one or more groups of functional subunits at one of the clock domains (204, 206, 208, 210, 212), and/or by slowing down a performance of an individual subunit of the processor. For example, any of the processor subunits may be slowed, or detuned, to a half-speed frequency, while the remaining subunits may be run at higher frequencies, in order to preserve an overall high performance of the processor. By slowing down, or detuning, a performance of one or more subunits of the processor, the remaining processor subunits may be operated at higher frequencies to increase the performance of the processor without risking a performance failure.

Figure 3:
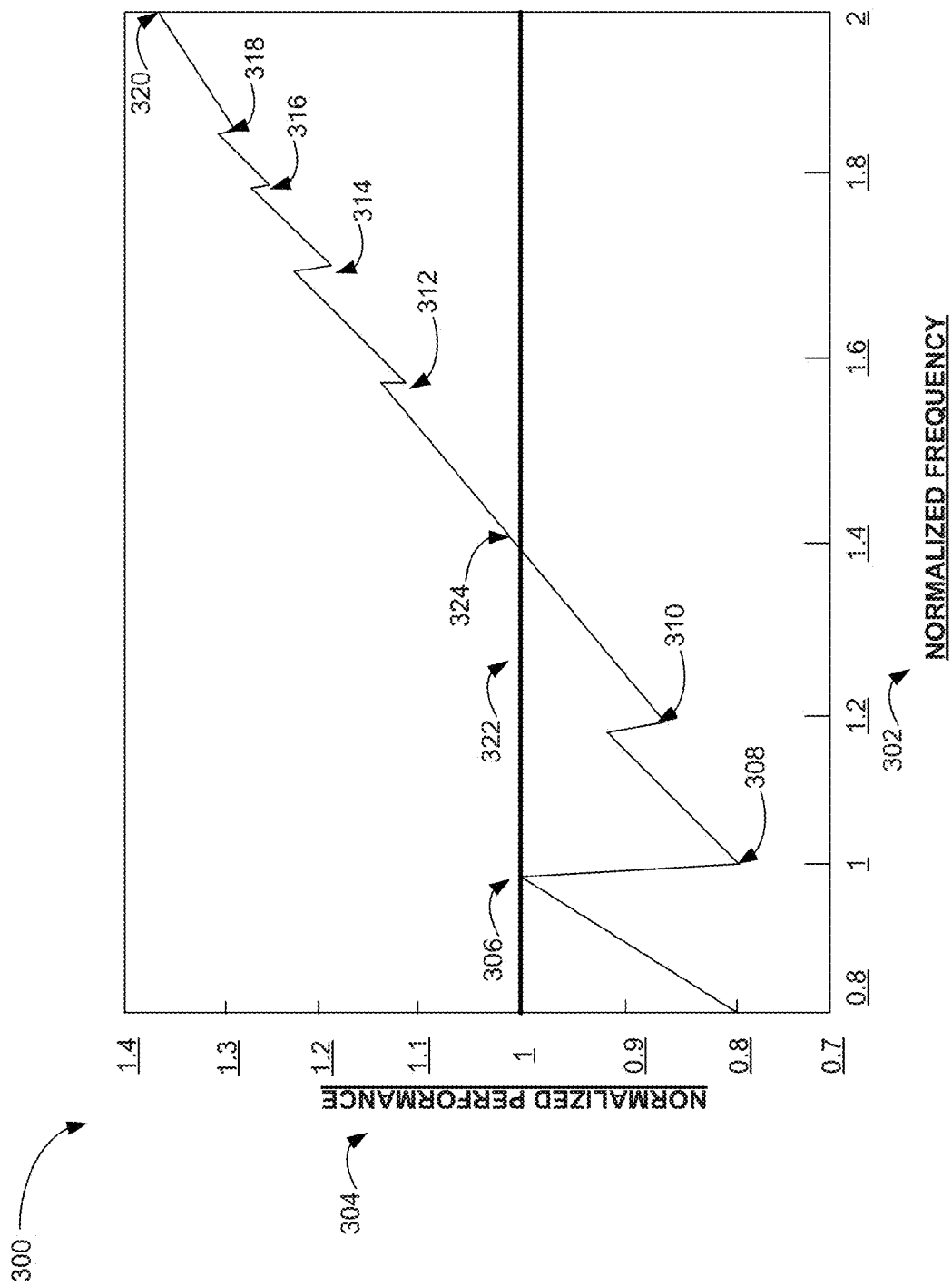
FIG. 3 illustrates an example overall performance of a processor while detuning subunits of the processor.

FIG. 3 illustrates an example overall performance of a processor while detuning subunits of the processor, arranged in accordance with at least some embodiments described herein.

In the graphical illustration demonstrated in a diagram 300, a performance of a processor that includes a multitude of subunits may be preserved while one or more of the subunits are slowed to a half-speed performance. An x-axis of the illustration represents a normalized frequency 302 of the processor, and a y-axis represents a normalized performance 304 of the processor. A datacenter hosting the processor may instruct the processor to detune one or more subunits associated with the processor to manage the one or more limiting or weak subunits during a frequency increase of the processor to extract additional performance from the processor. Each illustrated drop of the normalized performance 304 (that is, at frequency points 308, 310, 312, 314, 316, 318) represents a time point where a processor subunit has been detuned to slow the subunit to half-speed frequency. At frequency point 306, there may have been no subunit half-speed reductions, and the processor may be operating at a baseline frequency and may provide a baseline performance 322. At the frequency point 308, a first subunit may have been detuned to slow the first subunit to half-speed while the overall frequency of the processor increases. At subsequent performance drop points (that is, the frequency points 310, 312, 314, 316, and 318) additional subunits may be detuned to slow the subunits to half-speed while the normalized frequency 302 of the processor continues to increase. By the time the processor is operating at about 1.4× the baseline frequency (demonstrated at the frequency point 324), the normalized performance 304 of the processor may be increased past the baseline performance 322, demonstrating an increased performance of the processor despite detuning at least two of the subunits to half-speed frequencies as instructed by the datacenter.

Additionally, at a maximum performance level 320, a total of six of the processor subunits have been detuned to half-speed frequencies. The maximum performance level 320 may demonstrate that the processor is capable of achieving an increased performance level by selectively slowing down, or detuning, limiting or weaker subunits to allow the processor to run faster and more efficiently. Furthermore, as demonstrated in diagram 300, the processor may include six or more different subunit performance capabilities, such that any combination of one or more of the subunits may be detuned to vary the frequency of the processor. For example, six different subunits may effectively have six bits of performance states or sixty-four possible performance profiles, which may result in different amounts of time to process a piece of encryption. Any increase in the number of available detuning levels further increases the available variations in performance.

A system according to embodiments may take advantage of the ability to alter a frequency of one or more subunits of the processor to rapidly and transparently change the performance of the processor in an unpredictable manner in order to randomize the performance time of a targeted function executed at the processor. Randomization of the performance time, of one or more targeted functions of a processor may enhance security against side channel attacks. Because a side channel attacker depends on precise measurement of functions to infer secure information, randomizing the processing time and power of the function may prevent the side channel attacker from discerning secure information. In an example scenario, performance changes may be altered by a virtual machine manager (VMM) at a hardware level of the processor without modifying or informing any software and without demanding any particular software compatibility, such that performance may be altered across a multitude of operating systems. The VMM may trigger a pipeline delay at the hardware level of a processor in order to vary the performance time of the targeted function. The pipeline delay may be triggered by causing one or more subunits of the processor to perform the targeted function at a reduced speed, such as a half-speed frequency. Additionally, the variation in performance may be smoothly altered by changing the amount of processor subunit detuning based on a perceived security situation. The perceived security situation may be determined based on certificates of collocated instances, observed risky behavior, and/or signals of partial concern from an intrusion detection system.

Figure 4:
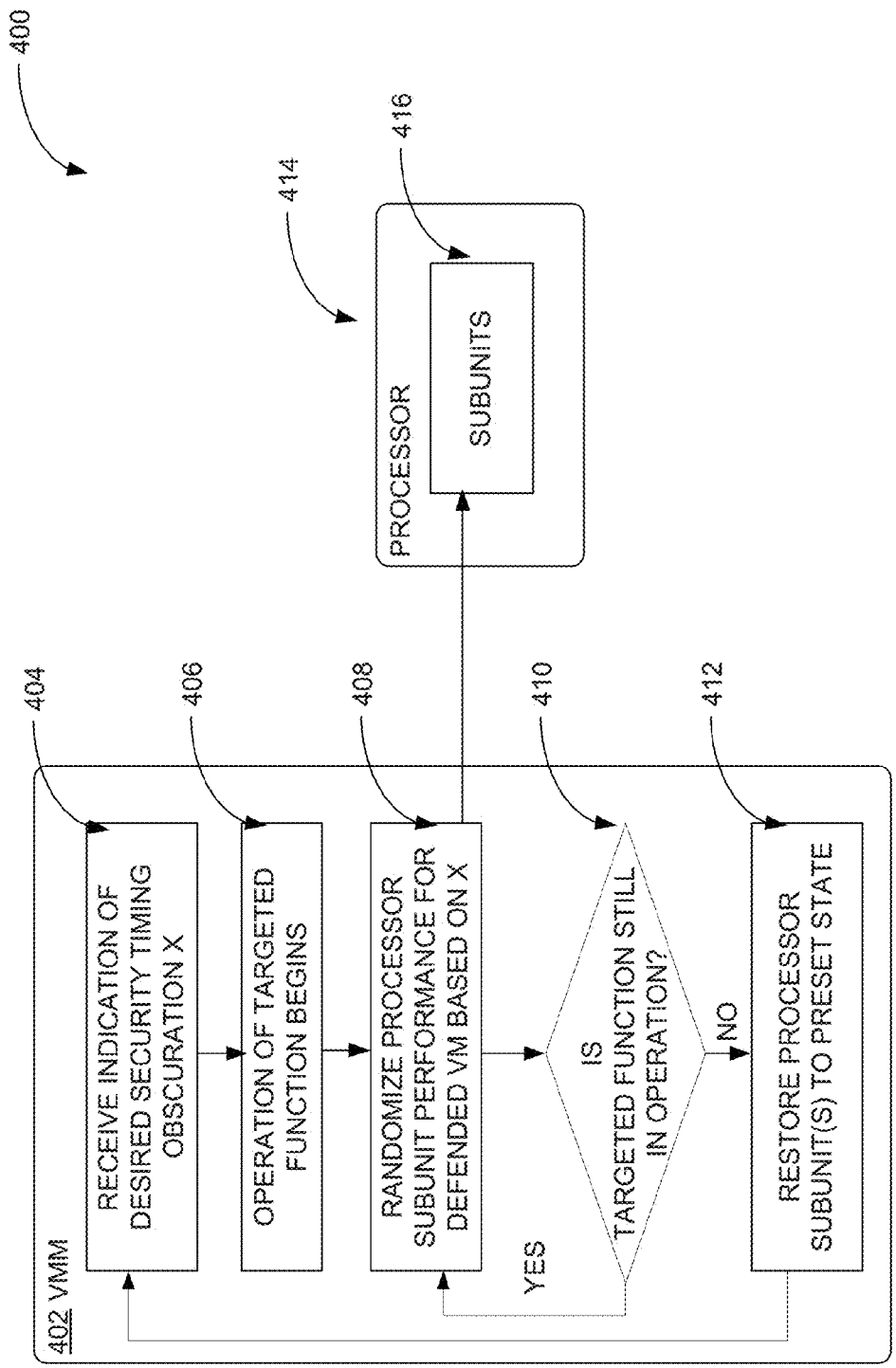
FIG. 4 illustrates an example system where subunits of a processor may be detuned to enhance security.

FIG. 4 illustrates an example system where detuning of subunits of a processor to enhance security may be implemented, arranged in accordance with at least some embodiments described herein.

As illustrated in a diagram 400, a VMM 402 may manage processes of a multitude of virtual machines at a datacenter. The VMM 402 may facilitate monitoring performance of a processor 414 associated with one or more of the virtual machines at the datacenter, monitoring for security risks, and implementing a process of randomizing a performance of one or more targeted functions of the processor 414 at the datacenter.

In a system according to embodiments, the VMM 402 may perform an operation 404 (RECEIVE INDICATION OF DESIRED SECURITY TIMING OBSCURATION X) and determine the preferred security timing obscuration based on a perceived level of security risk. In some examples, the security timing obscuration may be a normalized value (e.g. "X") in a range from zero to one, where zero may indicate no security obscuration and one may indicate a highest security obscuration. The value of the security timing obscuration may increase from zero to one as the perceived level of security risk increases. The input for determining the security timing obscuration may be based on a perceived security situation determined by the VMM 402. The perceived security situation may be determined based on a number, an identity and certificates of collocated instances, observed risky behavior, and/or signals of partial concern from an intrusion detection system operating at the datacenter. For example, an intrusion detection system executed at the datacenter may monitor processes at the datacenter and may observe a perceived security risk. The perceived security risk may be communicated from the intrusion detection system to the VMM 402. The perceived security risk may, in some embodiments, be communicated by another source such as an application or operating system. For example, an application may communicate a higher security risk when processing payment information.

After the security timing obscuration has been determined by the VMM 402, the VMM 402 may perform an operation 406 (OPERATION OF TARGETED FUNCTION BEGINS), where the initiation of the operation of a targeted function at the processor may be detected or initiated by the VMM 402. An example targeted function may include encryption, payment processing, privilege escalation, or other similar process of the processor 414. The targeted function of the processor may be identified by the VMM 402 at the datacenter through profiling. Profiling may include use of a profiling type virtual instrumentation and building of a flow table of frequently used automated processes at the VMM 402 for performance monitoring, detecting problems, optimization, and similar processes. The profiling type virtual instrumentation may run a process through a profiler to measure an array of variables and collect information on processor usage, memory usage, cache data, memory bandwidth, and time-based data. A flow table may be built from the profile, and may allow for automated finding and identification of targeted functions to be protected at the datacenter. For example, the datacenter may use the profiling and flow table to automatically identify vulnerable targeted functions within a customer application at the datacenter, without manual intervention or modification.

Additionally, the datacenter may provide code decorators for various coding languages that may flag a targeted function for security protection. An example code decorator may be added by the datacenter to a targeted function code to serve as a signal to the VMM 402 to execute defense timing resistance for security protection against side channel attacks. In further examples, targeted functions may be identified by an application or operating system sending information before and after the operation, for example through an API or system call.

In an example embodiment, after detecting an initiation of the targeted function, the VMM 402 may perform an operation 408 (RANDOMIZE PROCESSOR SUBUNIT PERFORMANCE FOR DEFENDED VM BASED ON X). At the operation 408, a performance of the processor subunits 416 associated with the targeted function may be randomized based on the determined security timing obscuration value to provide security. The processor subunits' performance may be randomized by detuning one or more of the subunits 416, for example, where the detuning reduces a performance speed of the subunit to a half-speed or a different value. The amount of detuning may be based on the security timing obscuration value. For example, at a lower perceived security risk (that is, a security timing obscuration value less than or equal to 0.5) the subunits 416 may be detuned less aggressively. Similarly, at a higher perceived security risk, the subunits 416 may be detuned more aggressively. An aggressiveness of the detuning may refer to a number of subunits that are detuned concurrently to a lower frequency, and/or a length of time the subunits 416 are detuned.

In an example scenario, if the processor 414 has eight bits of possible subunit alteration (that is, eight subunits), the security timing obscuration value may be used as a proportion to indicate a number, probability, and/or frequency of subunits being detuned to half-speed performance, and for how long the subunit(s) are to operate at half-speed. A change in performance of each of the one or more subunits may alter an effective instruction-level performance of the processor in random and unpredictable ways. Additionally, the change in subunit performance may affect an overall timing and a relationship between the timing and any content or encrypted keys, specifically randomizing timing relationships relied upon by a side channel attacker. Furthermore, subunit performance modification may be limited by the VMM 402 to the processor and subunit(s) executing the targeted function being protected. For example, if a virtual machine associated with the processor 414 moves the targeted function out of context, then the targeted function may be determined to be no longer in operation to result in the subunit(s) 416 being returned to a previous state before detuning.

In another example scenario, a timing analysis of example side channel attacks may indicate that timing for a targeted function may need to be accurate in a range from about 1.18% to 1.8% for a successful side channel attack. Changing the performance timing of the targeted function such that at least a few percent uncertainty is injected into an attacker's baseline timing measurement may thwart a timing based side channel attack.

After one or more of the subunits have been detuned at the operation 408, the VMM 402 may perform a decision operation 410 (IS THE TARGETED FUNCTION STILL IN OPERATION?). In response to determining that the targeted function is still in operation, the VMM 402 may return to operation 408 and continue to randomize detuning one or more of the processor subunits. In response to determining that the targeted function is no longer in operation, the VMM 402 may perform an operation 412 (RESTORE PROCESSOR SUBUNIT(S) TO PRESET STATE), where, the performance of the one or more subunits of the processor 414 may be returned to their previous performance state prior to detuning.

Embodiments may be implemented via hardware, software, and/or combinations of hardware and software components. The software components may operate with communication or signaling systems, to enhance security of targeted functions.

While embodiments have been discussed above using specific examples, components, scenarios, and configurations in FIG. 1, FIG. 2, FIG. 3, and FIG. 4 they are intended to provide a general guideline to be used to enhance security of targeted functions. These examples do not constitute a limitation on the embodiments, which may be implemented using other components, optimization schemes, and configurations using the principles described herein. For example, other approaches may be implemented than those provided as example.

Figure 5:
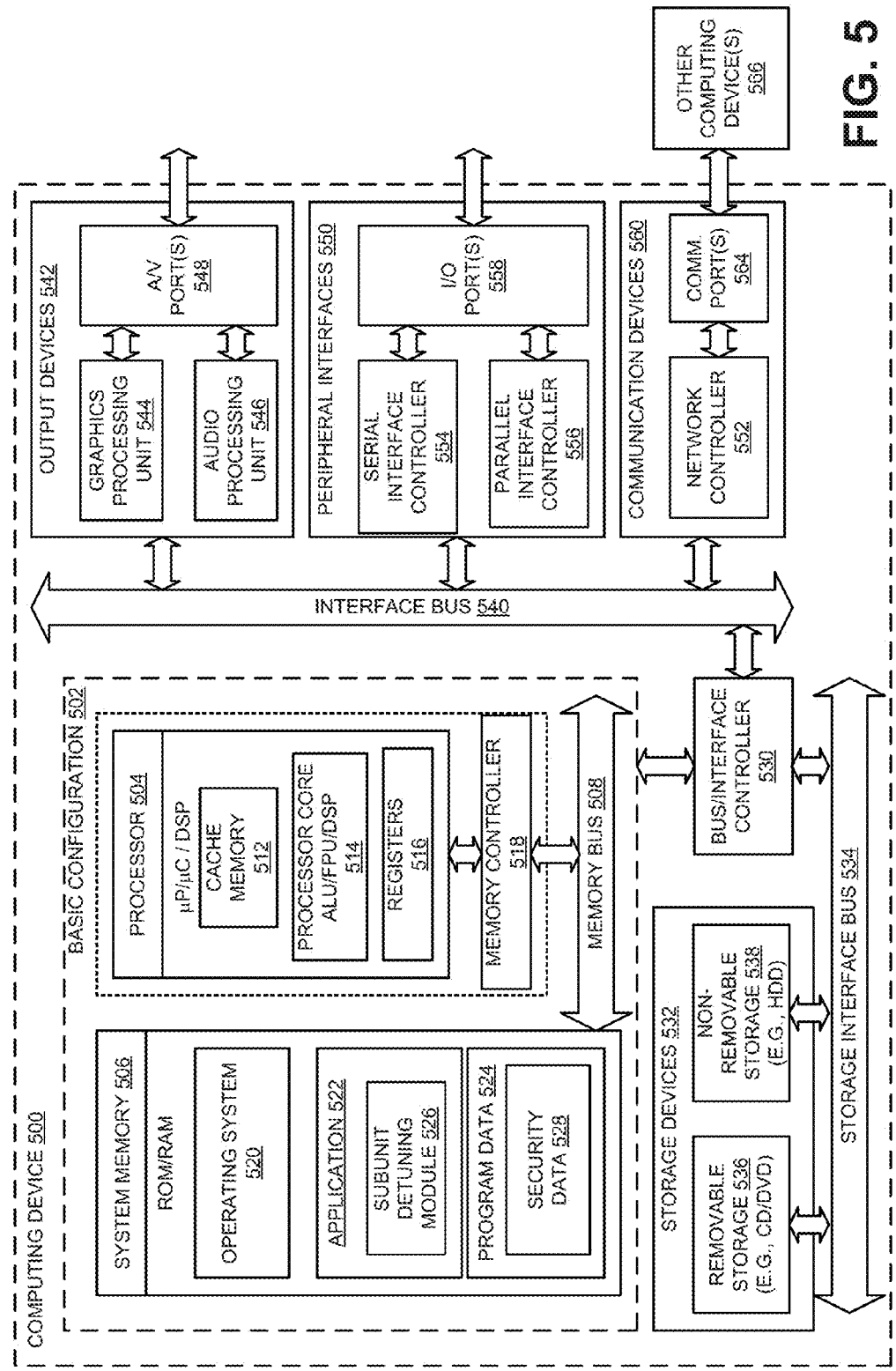
FIG. 5 illustrates a general purpose computing device, which may be used to enhance security of targeted functions performed.

FIG. 5 illustrates a general purpose computing device, which may be used to enhance security of targeted functions, arranged in accordance with at least some embodiments as described herein.

For example, a computing device 500 may be used as a server, desktop computer, portable computer, smart phone, special purpose computer, or similar device. In an example basic configuration 502, the computing device 500 may include one or more processors 504 and a system memory 506. A memory bus 508 may be used for communicating between the processor 504 and the system memory 506. The basic configuration 502 is illustrated in FIG. 4 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations, the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more applications 522, and program data 524. The application 522 may include a subunit detuning module 526, which may be an integral part of the application 522 or a separate application on its own.

The subunit detuning module 526 may facilitate reducing a performance of one or more processor subunits to a half-speed frequency based on a determined security risk. The program data 524 may include, among other data, security data 528 determined by a virtual machine manager at a datacenter and/or captured by an intrusion detection system at the datacenter, for example, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 550, and one or more communication devices 560) to the basic configuration 502 via the bus/interface controller 530. Some of the example output devices 542 include a graphics processing unit 544 and an audio processing unit 546, which may be configured to communicate to various external devices such as a display or speakers via one or more A/V ports 548. One or more example peripheral interfaces 550 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 560 includes a network controller 552, which may be arranged to facilitate communications with one or more other computing devices over a network communication link via one or more communication ports 564. The one or more other computing devices 566 may include servers, client devices, smart appliances, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to enhance security of targeted functions. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
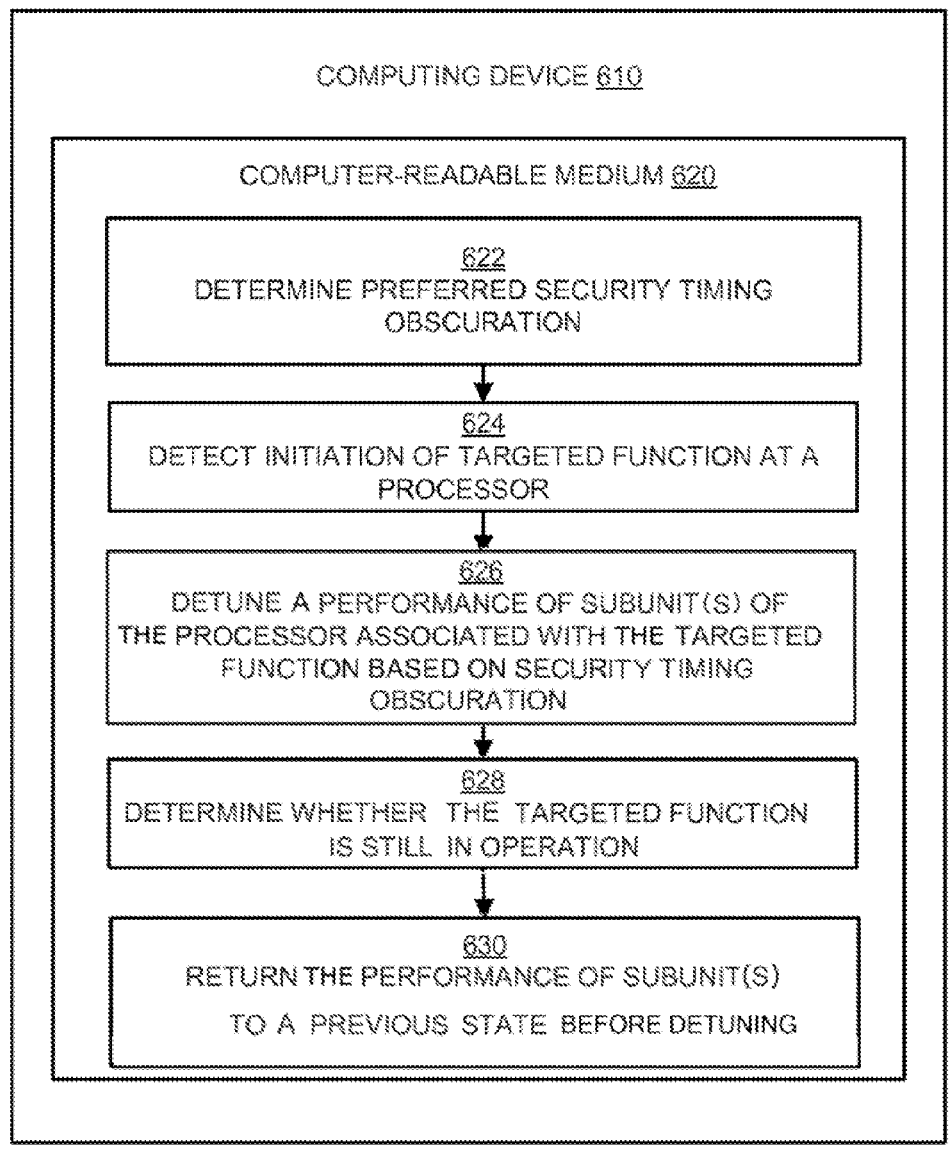
FIG. 6 is a flow diagram illustrating an example method to enhance security of targeted functions that may be performed by a computing device such as the computing device in FIG. 5.

FIG. 6 is a flow diagram illustrating an example method to enhance security of targeted functions that may be performed by a computing device such as the computing device in FIG. 5, arranged in accordance with at least some embodiments as described herein.

Example methods may include one or more operations, functions or actions as illustrated by one or more of blocks 622, 624, 626, 628, and 630. The operations described in the blocks 622 through 630 may also be stored as computer-executable instructions in a computer-readable medium such as a computer-readable medium 620 of a computing device 610.

An example process to enhance security of targeted functions may begin with block 622, "DETERMINE PREFERRED SECURITY TIMING OBSCURATION," where a virtual machine manager (e.g., VMM 402) at a datacenter may identify a perceived security risk, and may determine a preferred security timing obscuration value.

Block 622 may be followed by block 624, "DETECT INITIATION OF A TARGETED FUNCTION AT A PROCESSOR," where initiation of operation of a targeted function at the processor may be detected. The targeted function of the processor may be identified by the VMM (e.g., VMM 402) at the datacenter through automated profiling.

Block 624 may be followed by block 626, "DETUNE A PERFORMANCE OF SUBUNIT(S) OF THE PROCESSOR ASSOCIATED WITH THE TARGETED FUNCTION BASED ON THE SECURITY TIMING OBSCURATION," where a performance of one or more of the processor subunits associated with the targeted function may be reduced to a half-speed or other frequency by the VMM based on the determined security timing obscuration value.

Block 626 may be followed by block 628, "DETERMINE WHETHER THE TARGETED FUNCTION IS STILL IN OPERATION," where the VMM (e.g., VMM 402) may determine if the targeted function is still in operation. In response to a determination that the targeted operation is still in operation, the VMM (e.g., VMM 402) may continue to detune one or more of the processor subunits.

Block 628 may be followed by block 630, "RETURN THE PERFORMANCE OF THE SUBUNIT(S) TO A PREVIOUS STATE BEFORE DETUNING." where, in response to detection that the targeted function is no longer in operation, the performance of the one or more subunits of the processor may be returned to their previous performance state before the detuning by the VMM 402.

The blocks included in the above described process are for illustration purposes. Enhancement of security of targeted functions may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

Figure 7:
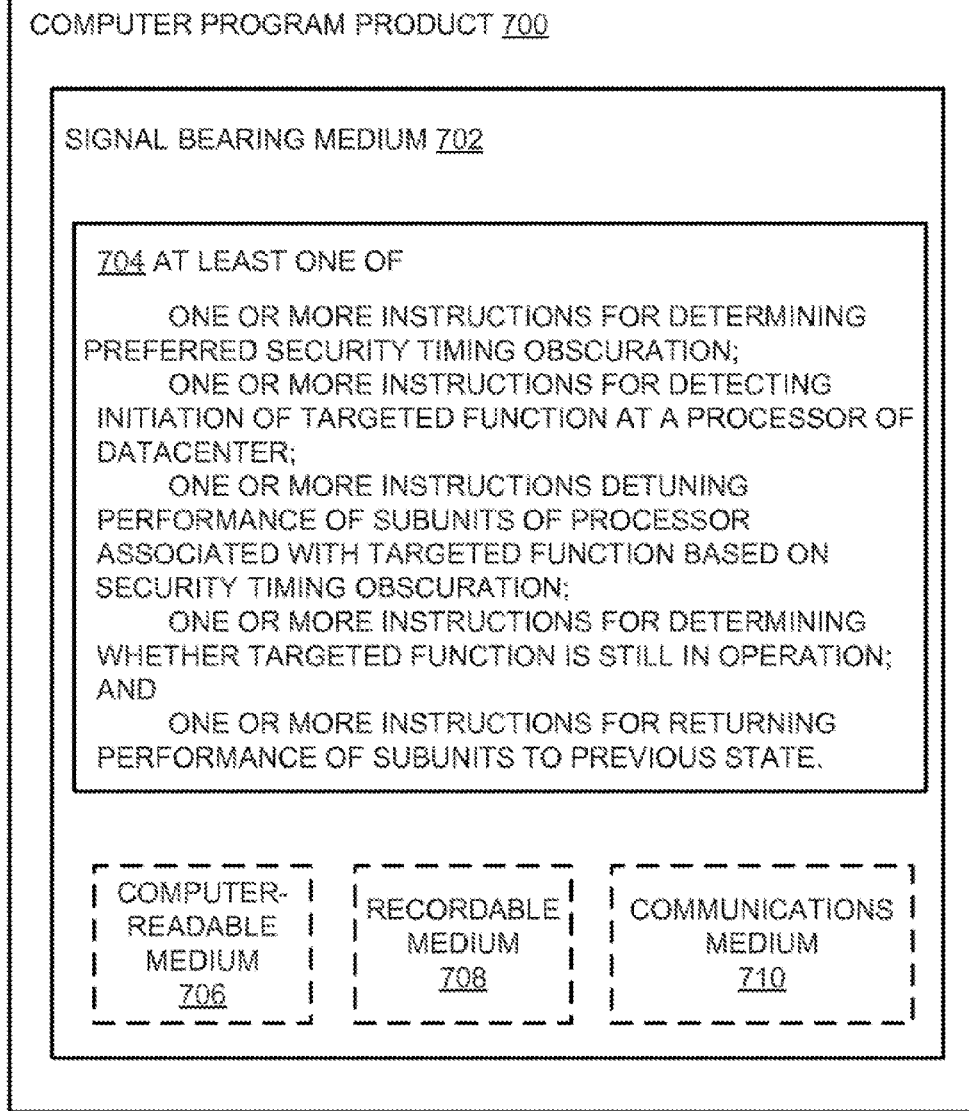
FIG. 7 illustrates a block diagram of an example computer program product, all arranged in accordance with at least some embodiments described herein.

FIG. 7 illustrates a block diagram of an example computer program product, arranged in accordance with at least some embodiments as described herein.

In some embodiments, as shown in FIG. 7, the computer program product 700 may include a signal bearing medium 702 that may also include one or more machine readable instructions 704 that, when executed by, for example, a processor may provide the functionality described above with respect to FIG. 5 and FIG. 6. Thus, for example, referring to the processor 504 in FIG. 5, the subunit detuning module 526 executed on the processor 504 may undertake one or more of the tasks shown in FIG. 7 in response to the instructions 704 conveyed to the processor 504 by the signal bearing medium 702 to perform actions associated with enhancement of security of targeted functions as described herein. Some of those instructions may include, for example, one or more instructions to determine preferred security timing obscuration, detecting initiation of a targeted function at a processor, to detune a performance of subunit(s) of the processor associated with the targeted function based on the security timing obscuration, to determine whether the targeted function is still in operation, and to return the performance of the subunit(s) to a previous state before detuning, according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (for example, a fiber optic cable, a waveguide, a wired communications link, a wireless communication link, etc.). Thus, for example, the computer program product 700 may be conveyed to one or more modules of the processor 504 of FIG. 5 by an RF signal bearing medium, where the signal bearing medium 702 may be conveyed by the wireless communications medium 710 (for example, a wireless communications medium conforming with the IEEE 802.11 standard).

According to some examples, the present disclosure describes methods to enhance security of targeted functions. An example method may include determining a preferred security timing obscuration, detecting initiation of execution of a targeted function at a processor, detuning a performance of one or more subunits of the processor associated with the targeted function based on the security timing obscuration, determining whether the targeted function is still in operation, and in response to a determination that the targeted function has completed operation, returning the performance of the one or more subunits to a previous state before the detuning.

According to other examples, the security timing obscuration may be a scaled value in a range from zero to one based on a perceived security risk. The method may also include determining the security timing obscuration based on at least one of: an indication from an intrusion detection system at a datacenter, observed risky behavior, a number of collocated tasks evaluated locally at the processor, and identity of collocated tasks evaluated locally at the processor. Detecting initiation of the targeted function at the processor may include detecting one or more of: an encryption, a payment processing, and a privilege escalation. Detecting initiation of the targeted function at the processor may further include employing one or more of: profiling type virtual instrumentation and building a flow table.

According to further examples, the method may further include increasing detuning the one or more subunits in response to a detected high security risk. Detuning the performance of one or more subunits of the processor may include identifying a number of bits of possible subunit alteration associated with the processor and applying the security timing obscuration as a proportion to indicate how many of the bits are detuned and how long each bit is detuned.

According to yet other examples, detuning the performance of one or more subunits processor may further include reducing a frequency of the one or more subunits. The method may also include enabling a virtual machine manager executed at a datacenter to detune the one or more subunits of the processor. The method may further include in response to a determination that the targeted function is still in operation, continuing detuning the one or more subunits of the processor. The method may also include in response to a determination that the targeted function is moved out of context, returning the performance of the one or more subunits to the previous state before the detuning.

The present disclosure also describes servers hosted at a datacenter configured to enhance security of targeted functions. An example server may include one or more virtual machines configured to be executed on the server, each virtual machine configured to provide computing services including data storage and data processing, and a virtual machine manager configured to manage the one or more virtual machines. The virtual machine manager may be further configured to determine a preferred security timing obscuration, detect initiation of a targeted function at a processor of at least one virtual machine of the datacenter, reduce a performance speed of at least one subunit of the processor associated with the targeted function based on the security timing obscuration, determine whether the targeted function is still in operation, and in response to a determination that the targeted function has completed operation, return the performance of the at least one subunit to a previous state before the performance speed reduction.

According to some examples, the security timing obscuration may be a scaled value in a range from zero to one based on a perceived security risk. The virtual machine manager may also be configured to determine the security timing obscuration based on at least one of: a received indication from an intrusion detection system of the datacenter, observed risky behavior, a number of collocated tasks evaluated locally at the processor, and identity of collocated tasks evaluated locally at the processor. The virtual machine manager may further be configured to detect one or more of: an encryption, a payment processing, and a privilege escalation to detect initiation of the targeted function at the processor, and/or detect the initiation of the targeted function through one or more of: profiling type virtual instrumentation and building a flow table.

According to further examples, the virtual machine manager may further be configured to further reduce the performance speed of the at least one subunit in response to a detected high security risk. The virtual machine manager may also identify a number of bits of possible subunit alteration associated with the processor and apply the security timing obscuration as a proportion to indicate how many of the bits are detuned and how long each bit is detuned. The virtual machine manager may also be configured to reduce a frequency of the at least one subunit to reduce the performance speed of the at least one subunit.

According to other examples, the virtual machine manager may reduce a frequency of the at least one subunit to a half-speed frequency, randomly select the subunit of the processor to reduce the performance speed, and/or in response to a determination that the targeted function is still in operation, continue the reduction of the performance speed of the at least one subunit of the processor. The virtual machine manager may further return the at least one subunit to a previous performance speed before the reduction in response to a determination that the targeted function is moved out of context. The virtual machine manager may further be configured to provide a code-decorator to flag a function of the processor as a targeted function.

The present disclosure also describes cloud-based datacenters configured to enhance security of targeted functions. An example datacenter may include one or more servers configured to execute one or more virtual machines, each virtual machine configured to provide computing services including data storage and data processing, and a virtual machine manager configured to manage the one or more virtual machines. The virtual machine manager is further configured to determine a preferred security timing obscuration, detect initiation of a targeted function at a processor of at least one virtual machine of the datacenter, detune a performance of at least one subunit of the processor associated with the targeted function based on the security timing obscuration, determine whether the targeted function is still in operation, and in response to a determination that the targeted function has completed operation, return the performance of the at least one subunit to a previous state before the performance speed reduction.

According to some examples, the security timing obscuration may be a scaled value in a range from zero to one based on a perceived security risk. The virtual machine manager may be further configured to determine the security timing obscuration based on at least one of: a received indication from an intrusion detection system of the datacenter, observed risky behavior, and a number and identity of collocated tasks evaluated locally at the processor. The virtual machine manager may also be configured to detect one or more of: an encryption, a payment processing, and a privilege escalation to detect initiation of the targeted function at the processor; detect the initiation of the targeted function through one or more of: profiling type virtual instrumentation and building a flow table; and/or increase a reduction of the performance of the at least one subunit in response to a detected high security risk.

According to further examples, the virtual machine manager may further be configured to identify a number of bits of possible subunit alteration associated with the processor and apply the security timing obscuration as a proportion to indicate how many of the bits are detuned and how long each bit is detuned. The virtual machine manager may also reduce a frequency of the at least one subunit to detune the performance of the at least one subunit, reduce a frequency of the at least one subunit to a half-speed frequency, detune the one or more subunits of the processor, and/or provide a code-decorator to flag a function of the processor as a targeted function.

The present disclosure further describes a computer readable storage medium with instructions stored thereon, which when executed on one or more computing devices execute a method to enhance security of targeted functions performed, including determining a preferred security timing obscuration, detecting initiation of operation of a targeted function at a processor, detuning a performance of one or more subunits of the processor associated with the targeted function based on the security timing obscuration, determining whether the targeted function is still in operation, and in response to a determination that the targeted function has completed operation, returning the performance of the one or more subunits to a previous state before the detuning.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent techniques and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors.

A typical data processing system may be implemented using any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various compositions, techniques, systems, and devices are described in terms of "comprising" various components or steps (interpreted as meaning "including, but not limited to"), the compositions, techniques, systems, and devices can also "consist essentially of" or "consist of" the various components and steps, and such terminology should be interpreted as defining essentially closed-member groups.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to enhance security of targeted functions, the method comprising:
   determining a preferred security timing obscuration;
   automatically identifying a vulnerable targeted function within a customer application at a datacenter by employing a profiling type virtual instrumentation that measures an array of variables and collects information on processor usage, memory usage, cache data, memory bandwidth, and time-based data to build a flow table that allows for the automated identification of the targeted function;
   detecting initiation of execution of the targeted function at a processor;
   detuning a performance of one or more subunits of the processor associated with the targeted function based on the security timing obscuration by:
      identifying a number of bits of possible subunit alteration associated with the processor, and
      applying the security timing obscuration as a proportion to indicate how many of the bits are detuned and how long each bit is detuned, wherein
         a number of the one or more subunits whose performance are detuned is based on a perceived security risk, and a length of time during which the performance of the one or more subunits are detuned is based on the perceived security risk;

determining whether the targeted function is still in operation; and in response to a determination that the targeted function has completed operation, returning the performance of the one or more subunits to a previous state before the detuning.

2. The method of claim 1, further comprising:
determining the security timing obscuration based on at least one of an indication from an intrusion detection system at a datacenter, observed risky behavior, a number of collocated tasks evaluated locally at the processor, and identity of collocated tasks evaluated locally at the processor.

3. The method of claim 1, wherein detecting initiation of the targeted function at the processor comprises:
detecting one or more of an encryption, a payment processing, and a privilege escalation.

4. The method of claim 1, further comprising:
increasing detuning the one or more subunits in response to a detected high security risk.

5. The method of claim 1, wherein detuning the performance of one or more subunits processor further comprises:
reducing a frequency of the one or more subunits.

6. A hardware server hosted at a datacenter configured to enhance security of targeted functions, the hardware server comprising:
a memory configured to store instructions; and
a processor coupled to the memory, the processor configured to execute a virtual machine manager configured to manage one or more virtual machines being executed on the hardware server, wherein the virtual machine manager is further configured to:
determine a preferred security timing obscuration;
automatically identify a vulnerable targeted function within a customer application at the datacenter by employing a profiling type virtual instrumentation that measures an array of variables and collects information on processor usage, memory usage, cache data, memory bandwidth, and time-based data to build a flow table that allows for the automated identification of the targeted function;
detect initiation of the targeted function at a processor of at least one virtual machine of the datacenter;
reduce a performance speed of one or more subunits of the processor associated with the targeted function based on the security timing obscuration, wherein
the performance speed reduction comprises:
identification of a number of bits of possible subunit alteration associated with the processor, and application of the security timing obscuration as a proportion to indicate how many of the bits are detuned and how long each bit is detuned,
a number of the one or more subunits whose performance speed are reduced is based on a perceived security risk, and
a length of time during which the performance speed of the one or more subunits are reduced is based on the perceived security risk;
determine whether the targeted function is still in operation; and
in response to a determination that the targeted function has completed operation, return the performance of the one or more subunits to a previous state before the reduction of the performance speed.

7. The hardware server of claim 6, wherein the virtual machine manager is further configured to:
reduce a frequency of the one or more subunits to reduce the performance speed of the one or more subunits.

8. The hardware server of claim 7, wherein the virtual machine manager is further configured to:
reduce a frequency of the one or more subunits to a half-speed frequency.

9. The hardware server of claim 6, wherein the virtual machine manager is further configured to:
randomly select the one or more subunits of the processor to reduce the performance speed.

10. The hardware server of claim 6, wherein the virtual machine manager is further configured to:
in response to a determination that the targeted function is still in operation, continue the reduction of the performance speed of the one or more subunits of the processor.

11. The hardware server of claim 6, wherein the virtual machine manager is further configured to:
in response to a determination that the targeted function is moved out of context, return the one or more subunits to a previous performance speed before the reduction.

12. The hardware server of claim 6, wherein the virtual machine manager is further configured to:
provide a code-decorator to flag a function of the processor as a targeted function.

13. A cloud-based datacenter configured to enhance security of targeted functions, the datacenter comprising:
one or more virtual machines, each virtual machine configured to provide computing services including data storage and data processing; and
a hardware server configured to execute the one or more virtual machines, the hardware server comprising:
a memory configured to store instructions; and
a processor coupled to the memory, the processor configured to execute a virtual machine manager configured to manage the one or more virtual machines being executed on the hardware server, wherein the virtual machine manager is further configured to:
determine a preferred security timing obscuration;
automatically identify a vulnerable targeted function within a customer application at the datacenter by employing a profiling type virtual instrumentation that measures an array of variables and collects information on processor usage, memory usage, cache data, memory bandwidth, and time-based data to build a flow table that allows for the automated identification of the targeted function;
detect initiation of the targeted function at a processor of at least one virtual machine of the datacenter;
detune a performance of one or more subunits of the processor associated with the targeted function based on the security timing obscuration, wherein the performance is detuned by:
identification of a number of bits of possible subunit alteration associated with the processor, and
application of the security timing obscuration as a proportion to indicate how many of the bits are detuned and how long each bit is detuned,
a number of the one or more subunits whose performance are detuned is based on a perceived security risk, and
a length of time during which the performance of the one or more subunits are detuned is based on the perceived security risk;

determine whether the targeted function is still in operation; and in response to a determination that the targeted function has completed operation, return the performance of the one or more subunits to a previous state before the performance was detuned.

14. The cloud-based datacenter of claim 13, wherein the security timing obscuration is a scaled value in a range from zero to one based on the perceived security risk.

15. The cloud-based datacenter of claim 13, wherein the virtual machine manager is further configured to:
increase a reduction of the performance of the one or more subunits in response to a detected high security risk.

16. The cloud-based datacenter of claim 13, wherein the virtual machine manager is further configured to:
reduce a frequency of the one or more subunits to detune the performance of the at least one subunit.

17. The cloud-based datacenter of claim 13, wherein the virtual machine manager is further configured to:
detune the one or more subunits of the processor.

18. The cloud-based datacenter of claim 13, wherein the virtual machine manager is further configured to:
provide a code-decorator to flag a function of the processor as a targeted function.

\* \* \* \* \*